United States Patent
Hosokawa

(10) Patent No.: US 9,049,377 B2
(45) Date of Patent: Jun. 2, 2015

(54) IMAGE TAKING DEVICE AND IMAGE TAKING METHOD

(75) Inventor: Satoshi Hosokawa, Tokyo (JP)

(73) Assignees: NEC CASIO MOBILE COMMUNICATIONS, LTD., Kawasaki-Shi, Kanagawa (JP); NTT DOCOMO, INC., Tokyo (JP)

(*) Notice: Subject to any disclaimer, the term of this patent is extended or adjusted under 35 U.S.C. 154(b) by 83 days.

(21) Appl. No.: 13/504,453

(22) PCT Filed: Oct. 14, 2010

(86) PCT No.: PCT/JP2010/068528
§ 371 (c)(1),
(2), (4) Date: Apr. 26, 2012

(87) PCT Pub. No.: WO2011/052457
PCT Pub. Date: May 5, 2011

(65) Prior Publication Data
US 2012/0218453 A1     Aug. 30, 2012

(30) Foreign Application Priority Data

Oct. 27, 2009    (JP) ................................ 2009-245995

(51) Int. Cl.
*H04N 5/222* (2006.01)
*H04N 5/232* (2006.01)
(Continued)

(52) U.S. Cl.
CPC ........ *H04N 5/23293* (2013.01); *H04N 1/00307* (2013.01); *H04N 5/23229* (2013.01); *H04N 2101/00* (2013.01); *H04N 5/232* (2013.01);
(Continued)

(58) Field of Classification Search
CPC .................................................... H04N 5/23293
USPC ........................................ 348/333.11, 333.05
See application file for complete search history.

(56) References Cited

U.S. PATENT DOCUMENTS 6,903,762 B2 *   6/2005   Prabhu et al. .............. 348/207.1
8,605,005 B2    12/2013   Lee et al.
(Continued)

FOREIGN PATENT DOCUMENTS

CN          1913683 A     2/2007
JP       2001-117163 A     4/2001
(Continued)

OTHER PUBLICATIONS

International Search Report in PCT/JP2010/068528 dated Jan. 25, 2011(English Translation Thereof).
(Continued)

*Primary Examiner* — Tuan Ho
*Assistant Examiner* — Zhenzhen Wu
(74) *Attorney, Agent, or Firm* — McGinn IP Law Group, PLLC

(57) ABSTRACT

Provided is an image taking device having high image taking efficiency when a plurality of images are continuously taken. The image taking device comprises an image taking unit which performs image capturing processing and processing for creating a taken image, a first image processing unit which creates a live view image from a captured image captured by the image taking unit, a second image processing unit which creates a preview image from the taken image, a third image processing unit which performs processing for storing the taken image, and a display unit which displays the live view image and displays the preview image.

23 Claims, 9 Drawing Sheets

(51) Int. Cl.
  *H04N 1/00* (2006.01)
  *H04N 5/77* (2006.01)
  *H04N 9/804* (2006.01)
  *H04N 101/00* (2006.01)
  *G03B 17/20* (2006.01)

(52) U.S. Cl.
  CPC ............. *H04N 5/772* (2013.01); *H04N 9/8042* (2013.01); *G03B 17/20* (2013.01)

(56) References Cited

U.S. PATENT DOCUMENTS

| | | |
|---|---|---|
| 8,605,007 B2 | 12/2013 | Lee et al. |
| 2005/0275737 A1 | 12/2005 | Cheng |
| 2007/0035616 A1 | 2/2007 | Lee et al. |
| 2009/0237547 A1* | 9/2009 | Misawa et al. ........... 348/333.01 |
| 2010/0026873 A1* | 2/2010 | Lee .......................... 348/333.05 |

FOREIGN PATENT DOCUMENTS

| | | | |
|---|---|---|---|
| JP | 2004-064710 A | | 2/2004 |
| JP | 2004-104335 A | | 4/2004 |
| JP | 2005159538 A | * | 6/2005 |
| JP | 2005-354690 A | | 12/2005 |
| JP | 2006-261912 A | | 9/2006 |
| JP | 2006-261912 A5 | | 3/2008 |
| JP | 2008-109221 A | | 5/2008 |

OTHER PUBLICATIONS

Chinese Office Action dated Jun. 26, 2014, with English translation.

* cited by examiner

IMAGE TAKING DEVICE AND IMAGE TAKING METHOD

TECHNICAL FIELD

The present invention relates to a device, a method, and a program of taking a still image, as well as a recording medium.

BACKGROUND ART

For example, Patent Literature 1 and Patent Literature 2 describe techniques relating to an improvement of efficiency in taking a still image.

An electronic image device described in Patent Literature 1 displays a live view (displaying a live preview image in Patent Literature 1) on a display screen, and also displays a histogram at the same time. Therefore, it becomes possible to check and adjust properties of an image before the image data is stored in a memory unit.

An image taking device described in Patent Literature 2 displays a temporarily taken image in a slave screen together with an exposure condition. Thus, it is possible to check and adjust an effect of taking an image before actually taking the image.

CITATION LIST

Patent Literature

Patent Literature 1: JP 2005-354690 A
Patent Literature 2: JP 2006-261912 A

SUMMARY OF INVENTION

Technical Problem

Unfortunately, in the case of the image taking devices of Patent Literature 1 and Patent Literature 2 for displaying a live view, there exists a chance that a time lag may occur, after actually taking an image subsequent to temporarily taking the image and/or adjusting properties of the image, and before resumption of displaying a live view. For example, sometimes a preview of a taken image is displayed throughout an entire display screen after execution of actually taking the image, and then displaying a live view resumes after completion of displaying the preview image. FIG. 9 shows an example of such a case. FIG. 9A shows a situation of displaying a live view prior to taking an image. FIG. 9B represents a situation after having started taking an image by means of shutter operation and the like, up to completion of image processing, compression processing, and storage processing with respect to the taken image; wherein a black screen is displayed throughout the entire display screen. Meanwhile, FIG. 9C shows a situation in which, after completion of taking the image, a preview image of the taken image is displayed on the entire screen. Then, FIG. 9D represents a situation in which displaying a live view has already started again after completion of displaying the preview image. In this case, a next image cannot be taken during the situation of FIG. 9C in which the preview image is displayed.

Therefore, for the image taking devices described in Patent Literature 1 and Patent Literature 2, it is difficult to take consecutive images in a quick manner. Furthermore, if once a shooting object gets out of the screen during the time lag, framing for taking a next image becomes difficult so that image taking efficiency further deteriorates.

On the other hand, if displaying a preview image as shown in FIG. 9C is not carried out at all to simply resume displaying a live view, it becomes impossible for a user of the image taking device to quickly check the image that is taken immediately before. Accordingly, without extra operation such as searching for the image while pausing image-taking operation, it is impossible to check whether the image has been taken, or taking the image should be tried again. Therefore, the image taking efficiency deteriorates as a result.

As described above, when the image taking devices described in Patent Literature 1 and Patent Literature 2 are used, it is impossible to increase the image taking efficiency in the case where a plurality of images are taken continuously.

It is an object of the present invention to provide an image taking device and an image taking method that have high image taking efficiency in the case of taking a plurality of images continuously.

Solution to Problem

An image taking device according to the present invention includes: an image taking unit for carrying out an image capturing process and a creating process of a taken image; a first image processing unit for creating a live view image by using an image captured by the image taking unit; a second image processing unit for creating a preview image by using the taken image; a third image processing unit for saving the taken image; and a displaying unit for displaying the preview image in addition to displaying the live view image.

A method of taking an image according to the present invention includes: an image capturing step for capturing an image; a taken-image creating step for creating a taken image; a first image processing step for creating a live view image by using an image captured through the image capturing step; a second image processing step for creating a preview image by using the taken image; a third image processing step for saving the taken image; and a displaying step for displaying the preview image in addition to displaying the live view image.

An image taking program according to the present invention executes the method of taking an image, according to the present invention, by using a computer.

A recording medium according to the present invention records the image taking program according to the present invention.

Advantageous Effects of Invention

According to the present invention, provided can be an image taking device having high image taking efficiency in the case of taking a plurality of images continuously.

DESCRIPTION OF EMBODIMENTS

Exemplary embodiments of the present invention are explained below with reference to accompanied drawings. Incidentally, the technological extent of the present invention is not limited by these embodiments.

Example 1

Figure 1:
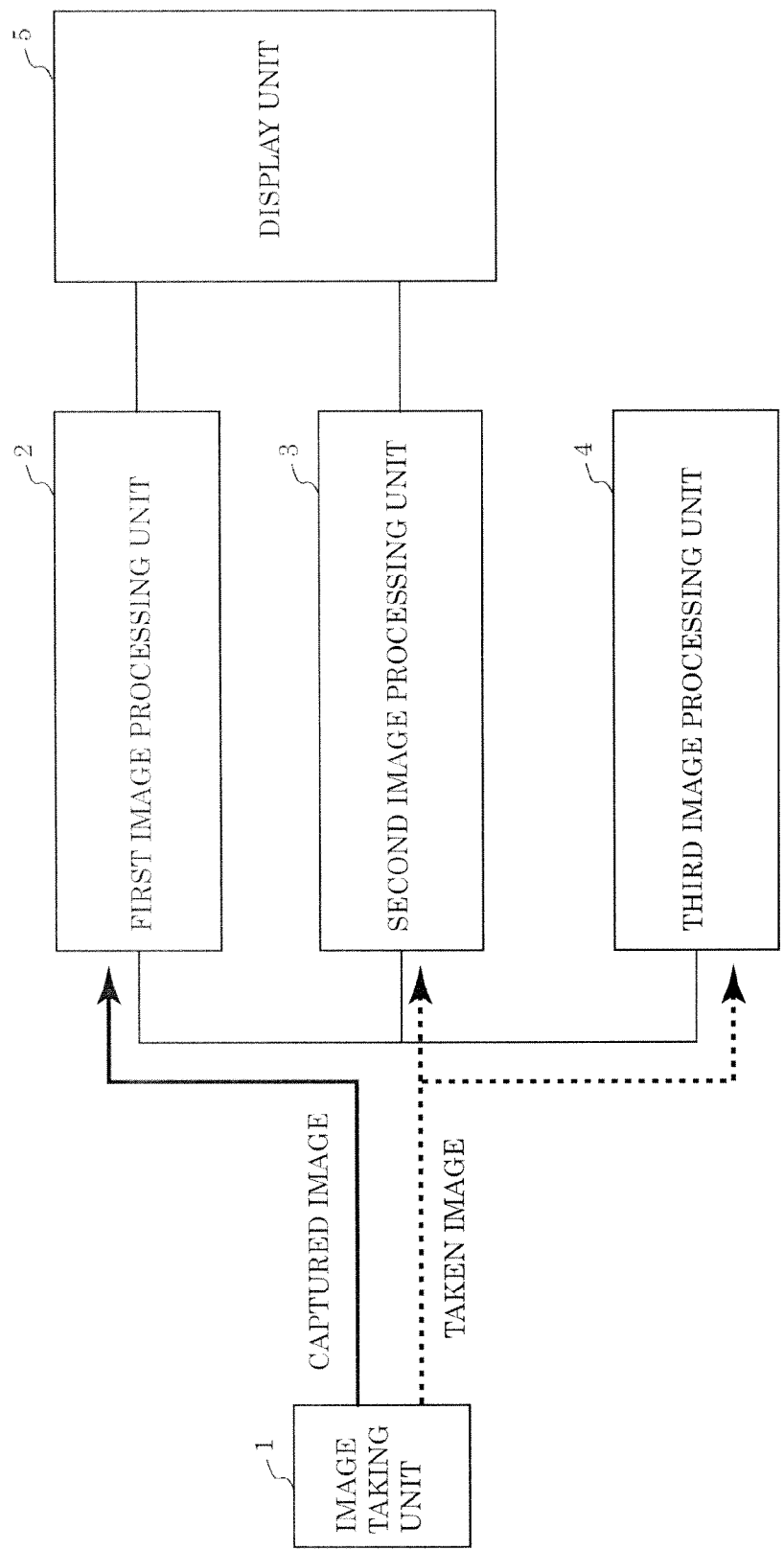
FIG. 1 shows an example of a configuration of an image taking device according to a first exemplary embodiment of the present invention.

FIG. 1 shows a configuration of an image taking device according to a first exemplary embodiment of the present invention.

The image taking device according to the present embodiment includes an image taking unit 1, a first image processing unit 2, a second image processing unit 3, a third image processing unit 4, and a display unit 5.

The image taking unit 1 carries out an image capturing process and a creating process of a taken image.

The first image processing unit 2 obtains an image captured through the image capturing process by the image taking unit 1, and then creates a live view image by using the captured image that has been obtained. The "captured image" is image data of a shooting object captured by the image taking unit 1. In the meantime, the "live view image" is an image as a result of processing the captured image for displaying a live view by the display unit 5. The process of creating the live view image by using the captured image includes, for example, a process of changing an angle of view and a size of the captured image. The "displaying a live view" means displaying the image, being captured by the image taking unit 1, almost in real time in the display unit.

The second image processing unit 3 obtains a taken image created through the creating process of a taken image, carried out by the image taking unit 1, and then creates a preview image by using the taken image that has been obtained. A process for creating the preview image by using the taken image includes, for example, a process for contracting the taken image. Incidentally, the "taken image" is an image taken by the image taking unit 1. Meanwhile, the "preview image" is an image as a result of processing the taken image for displaying a preview image by the display unit 5. The "displaying a preview image" means displaying the image, having already been taken, on a temporary basis.

The third image processing unit 4 obtains the taken image, in the same manner as the second image processing unit 3 does. More specifically, the second image processing unit 3 and the third image processing unit 4 individually obtain the same taken image. The third image processing unit 4 saves the taken image that has been obtained. The saving process includes a process of writing into a saving memory. Furthermore, the saving process may also includes a compression process, as well as a gradation converting process, an image sharpness adjusting process, a color conversion process, and the like with respect to the taken image. Incidentally, the compression process is an encoding process for conversion into, for example, a JPEG format (Joint Photographic Experts Group), or a GIF format (Graphics Interchange Format).

The display unit 5 displays the live view image created by the first image processing unit 2. Moreover, in the case where the second image processing unit 3 creates a preview image, the display unit 5 displays the preview image in addition to displaying the live view image. For example, the display unit 5 includes an LCD (Liquid Crystal Display).

Figure 2:
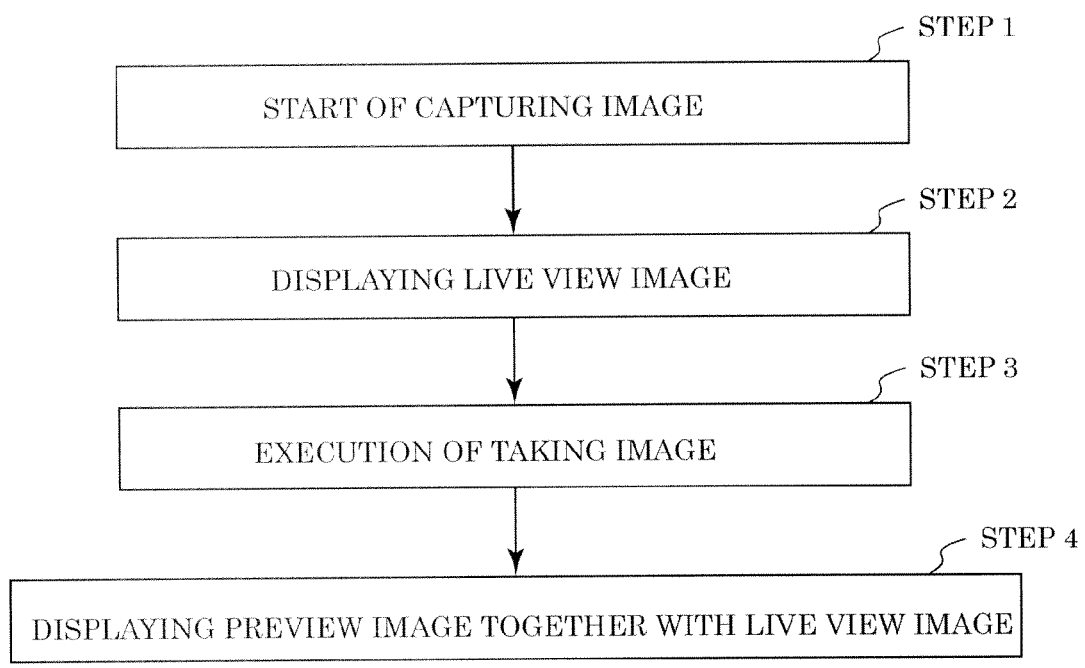
FIG. 2 shows an example of operation of the image taking device according to the first embodiment of the present invention.

Explained next with reference to FIG. 2 is operation of the image taking device according to the present embodiment.

At first, the image taking unit 1 starts capturing an image (Step 1).

Next, the first image processing unit 2 obtains the image captured by the image taking unit 1. Then, the first image processing unit 2 creates a live view image by using the captured image that has been obtained. The display unit 5 displays the live view image created by the first image processing unit 2. In other words, the display unit 5 carries out displaying the live view image (Step 2).

Then, subsequently if an image-taking command signal is input into the image taking unit 1, the image taking unit 1 creates a taken image. In other words, the image taking unit 1 executes taking an image (Step S3).

Next, the second image processing unit 3 obtains the taken image created by the image taking unit 1. Then, the second image processing unit 3 creates a preview image by using the taken image that has been obtained. Meanwhile, after completion of creating the taken image, the image taking unit 1 starts capturing an image again. In connection with this progress, the first image processing unit 2 starts creating a live view image again.

Then, if the second image processing unit 3 creates the preview image, the display unit 5 displays the preview image together with the live view image (Step 4).

Furthermore, the third image processing unit 4 obtains the taken image, in the same manner as the second image processing unit 3 does. Then, the third image processing unit 4 saves the taken image that has been obtained. In other words, the second image processing unit 3 and the third image processing unit 4 obtain the same taken image, and each of the processing units separately carries out its own process.

The saving process by the third image processing unit 4 includes a process of writing the taken image into the saving memory. Incidentally, the image taking device does not always need to have the saving memory internally. More specifically, the image taking device may be connected to an external saving memory unit, and then the third image processing unit 4 may write the taken image into the external saving memory unit. Furthermore, the saving process by the third image processing unit 4 may include a compression process, a gradation converting process, an image sharpness adjusting process, a color conversion process, and the like with respect to the taken image.

As described above, after completion of taking the image, the image taking device according to the present embodiment collectively displays the preview image and the live view image. Therefore, it becomes possible to increase the image taking efficiency at the time of taking a plurality of images continuously.

Example 2

Figure 3:
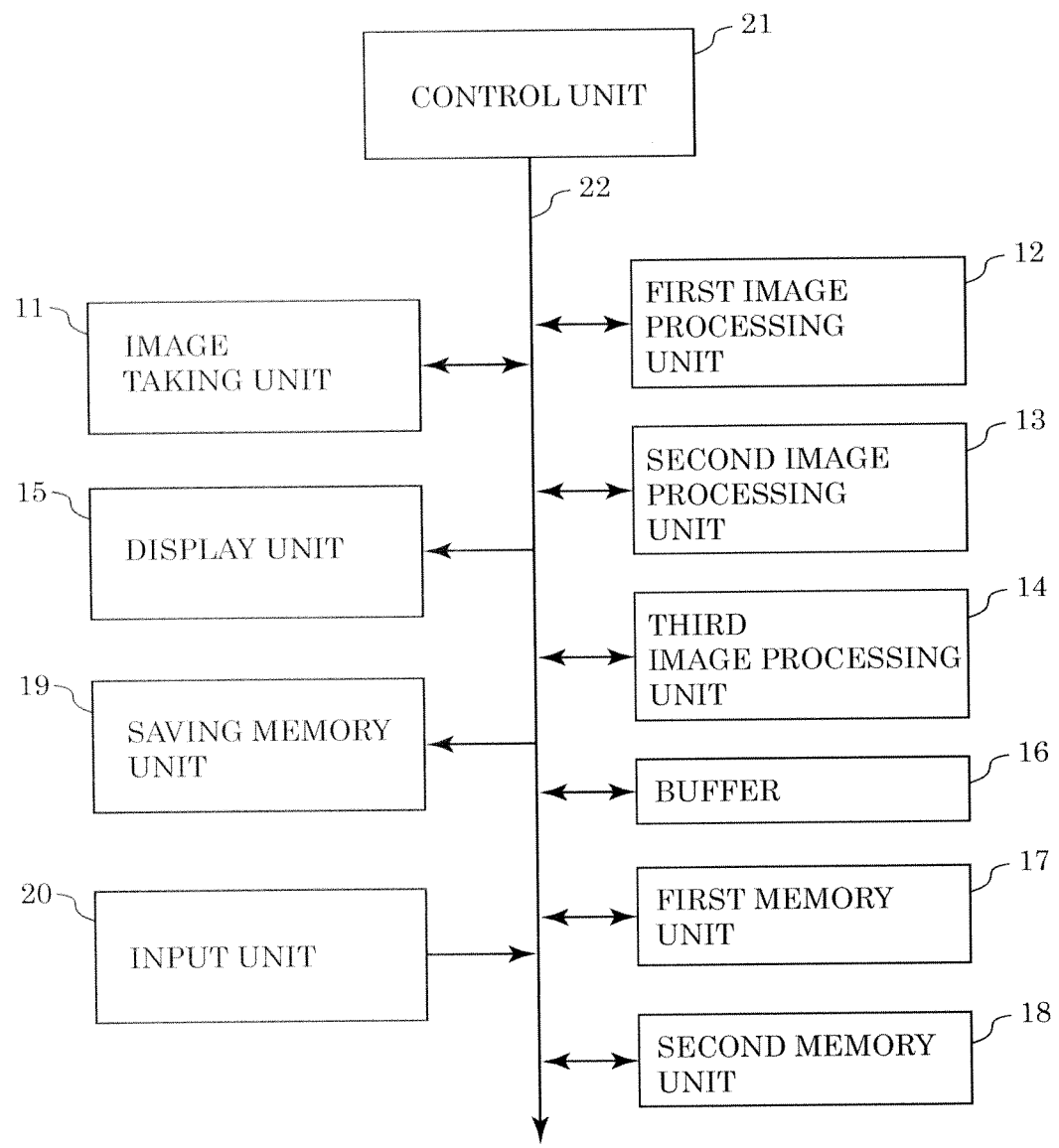
FIG. 3 shows an example of a configuration of an image taking device according to a second embodiment of the present invention.

Next, FIG. 3 shows a configuration of an image taking device according to a second exemplary embodiment of the present invention.

The image taking device according to the present embodiment includes an image taking unit 11, a first image processing unit 12, a second image processing unit 13, a third image processing unit 14, and a display unit 15. The image taking device according to the present embodiment further includes a buffer 16, a first memory unit 17, a second memory unit 18, a saving memory unit 19, a input unit 20, a control unit 21, and a buss 22.

The input unit 20 sends an image-taking command signal. The input unit 20 according to the present embodiment includes a shutter button. When a user of the image taking device holds down the shutter button, the input unit 20 sends an image-taking command signal.

The image taking unit 11 includes an image pickup device, such as a CCD (charge coupled device) and a CMOS (Complementary Metal Oxide Semiconductor); and carries out an image capturing process. Furthermore, the image taking unit 11 carries out an taken-image creating process according to the image-taking command signal sent from the input unit 20. For example, in the image capturing process for viewing a live image, a captured image with a less number of pixels is created by using part of pixels of the image pickup device for high-speed displaying operation. Meanwhile, in the taken-image creating process, a taken image is created by using almost all the pixels of the image pickup device.

The image taking unit 11 may further include a DSP (Digital Signal Processor), and then the captured image and the taken image may individually be handled through image processing by the DSP installed in the image taking unit 11. The image processing by the DSP may include, for example, noise correction, exposure compensation, white-balance adjustment, and so on.

The buffer 16 records the image captured by the image taking unit 11, and the taken image created by the image taking unit 11.

The first image processing unit 12 obtains the captured image recorded in the buffer 16, and creates a live view image by using the captured image that has been obtained.

The second image processing unit 13 obtains the taken image recorded in the buffer 16, and creates a preview image by using the taken image that has been obtained.

The third image processing unit 14 obtains the taken image recorded in the buffer 16, and carries out a saving process with respect to the taken image that has been obtained. The saving process carried out by the third image processing unit 14 includes a writing process with respect to the taken image into the saving memory unit.

The first memory unit 1 records the live view image created by the first image processing unit 12.

The second memory unit 18 records the preview image created by the second image processing unit 13.

The first memory unit 17 and the second memory unit 18 are memory units that save an image for displaying it in the display unit 15; and namely the memory units are, for example, a VRAM (Video Random Access Memory). As the first memory unit 17 of the present embodiment, for example, used is a VRAM for recording the live view image that is displayed on an entire screen of the display unit 15. Meanwhile, as the second memory unit 18, for example, used is a VRAM for recording the preview image that is displayed in a part of the display unit 15.

The display unit 15 displays the live view image recorded in the first memory unit 17, and the preview image recorded in the second memory unit 18.

The saving memory unit 19 is a memory unit in which the taken image is written through the saving process by the third image processing unit 14. The "saving memory unit" is a memory unit that saves memory data even without any power supply; for example, such as a non-volatile memory chip.

The control unit 21 controls operation of each component of the image taking device, through the buss 22.

Figure 4:
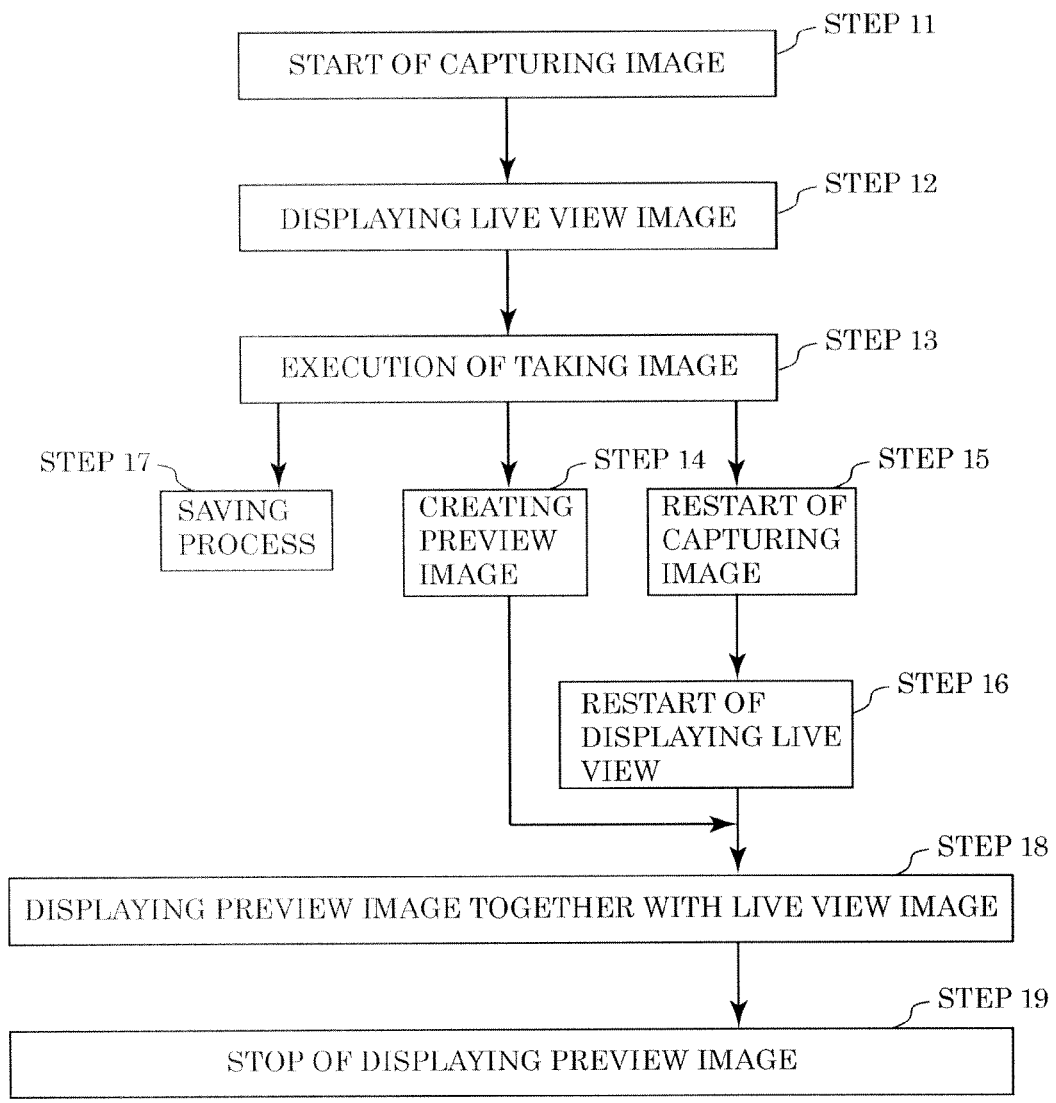
FIG. 4 shows an example of operation of the image taking device according to the second embodiment of the present invention.
Figure 5:
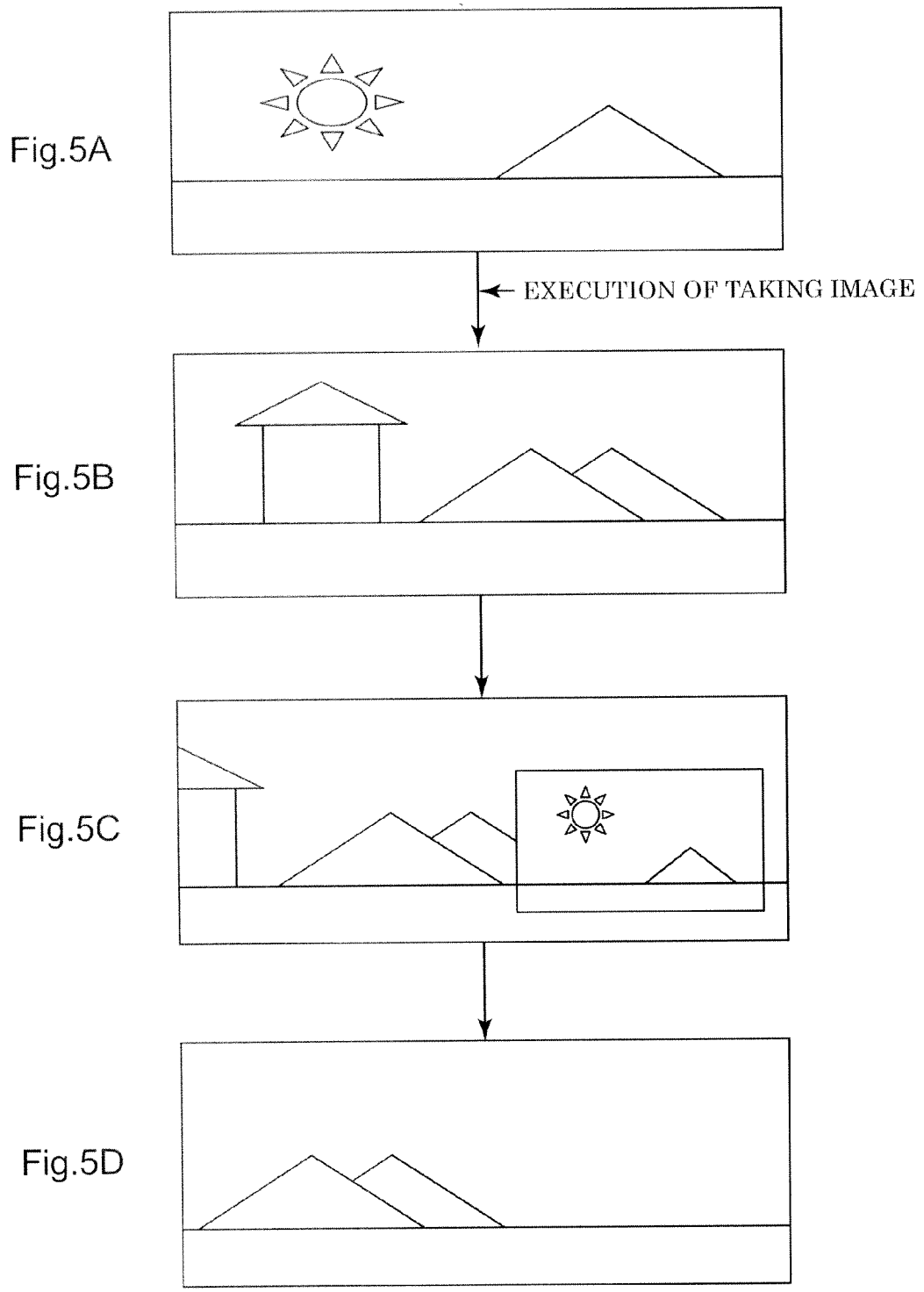
FIG. 5A to FIG. 5D show an example of a display by a display unit of the image taking device according to the second embodiment of the present invention.
Figure 6:
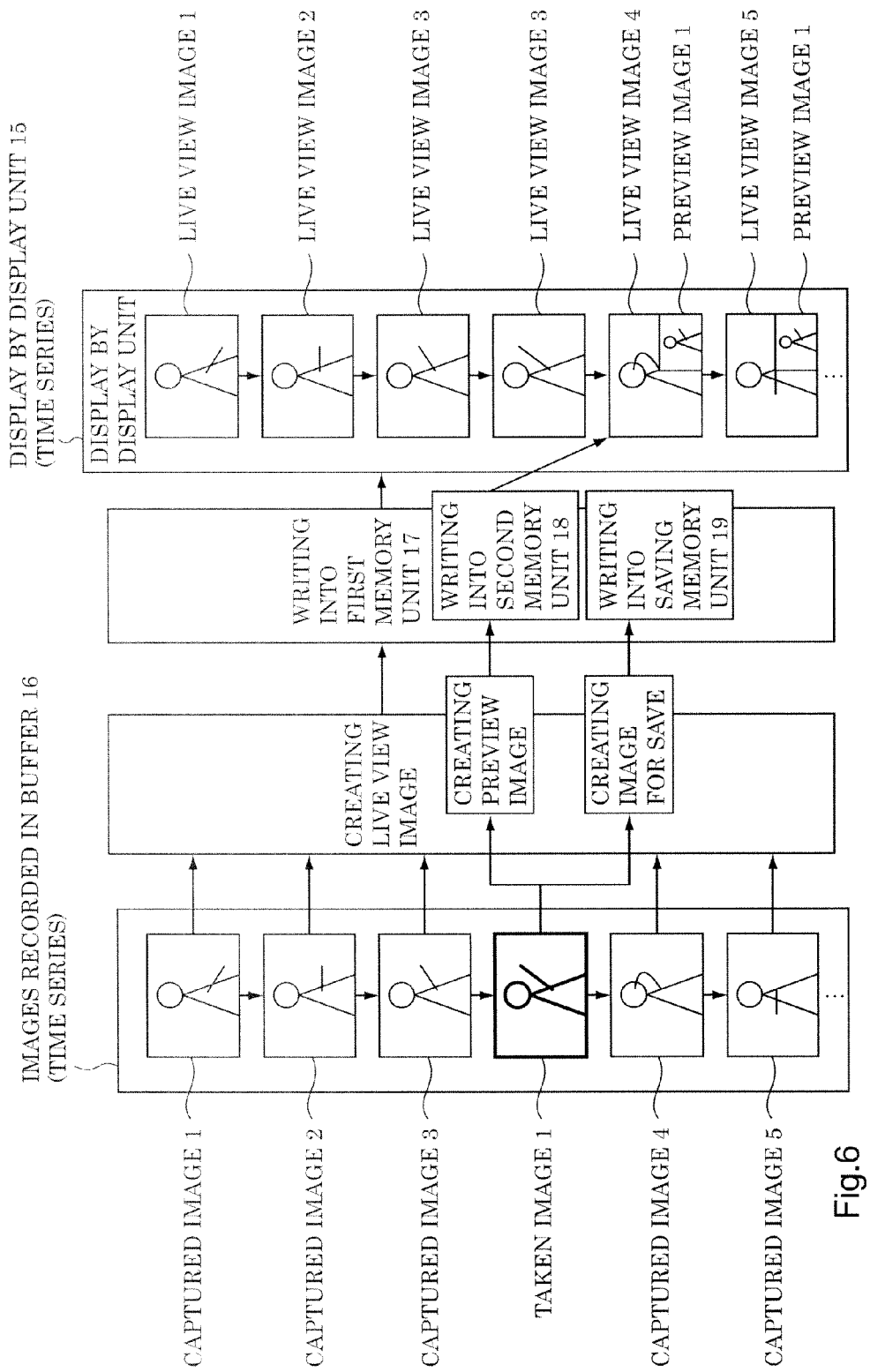
FIG. 6 shows a time-series example of images recorded in a buffer and images displayed in the display unit, in the image taking device according to the second embodiment of the present invention.

Explained next with reference to FIG. 4, FIG. 5, and FIG. 6 is operation of the image taking device according to the present embodiment.

At first, turning on the power for the image taking device starts capturing an image by the image taking unit 11 (Step 11).

The image captured by the image taking unit 11 is recorded in the buffer 16. Under the control of the control unit 21, the first image processing unit 12) obtains the captured image recorded in the buffer 16. Then, the first image processing unit 12 creates a live view image by using the captured image that has been obtained. The live view image created by the first image processing unit 12 is recorded in the first memory unit 17. Having obtained live view image recorded in the first memory unit 17 under the control of the control unit 21, the display unit 15 carries out displaying the live view image (Step 12). FIG. 5A shows an example of a display by the display unit 15 in Step 12.

Next, if the shutter button of the input unit 20 is held down, the input unit 20 sends an image-taking command signal. Under the control of the control unit 21, the image taking unit 11 receives the image-taking command signal, and then the image taking unit 11 carries out a taken-image creating process. In other words, the image taking unit 11 executes taking an image (Step 13).

The taken image created by the image taking unit 11 is recorded in the buffer 16. Under the control of the control unit 21, the second image processing unit 13 obtains the taken image recorded in the buffer 16. Then, the second image processing unit 13 creates a preview image by using the taken image that has been obtained (Step 14). Image processing operation by the second image processing unit 13 according to the present embodiment includes a process for contracting the taken image. The "process for contracting a taken image" means processing for displaying a preview image as a slave screen in a part of the display unit 15, as shown in FIG. 5C

Incidentally, at the time of creating the preview image by the second image processing unit 13, the processing time for the taken image is preferably short. Therefore, in the present embodiment, the image processing operation by the second image processing unit 13 does not include, for example, a gradation converting process, an image sharpness adjusting process, and a color conversion process with respect to the image. More preferably, the image processing operation by the second image processing unit 13 may include only the process for contracting the taken image.

In parallel with the process by the second image processing unit 13 with respect to the taken image (Step 14), the image taking unit 11 restarts capturing an image (Step 15). Furthermore, in connection with the restart of capturing an image by the image taking unit 11, the first image processing unit 12 also restarts the image processing operation. Then, the display unit 15 restarts displaying a live view image (Step 16). FIG. 5B shows an example of a display by the display unit 15 in Step 16.

Under the control of the control unit 21, the third image processing unit 14 obtains the taken image recorded in the buffer 16. On this occasion, the taken image that the second image processing unit 13 obtains is the same as the taken image that the third image processing unit 14 obtains. Then, the third image processing unit 14 carries out a saving process with respect to the taken image that has been obtained (Step 17). More specifically, the third image processing unit 14 writes the taken image into the saving memory unit 19. On this occasion, the control unit 21 may control in such a manner that the saving process by the third image processing unit 14 (Step 17) starts in parallel with the image processing operation by the second image processing unit 13 (Step 14) and the restart of capturing an image by the image taking unit 11 (Step 15). Alternatively, the control unit 21 may also control in such a manner that the saving process by the third image processing unit 14 starts after the image processing operation by the second image processing unit 13.

Incidentally, the saving process with respect to the taken image by the third image processing unit 14 may include a compression process, a gradation converting process, an image sharpness adjusting process, a color conversion process, and the like with respect to the taken image, in addition to the writing process with respect to the taken image into the saving memory unit 19.

As the image processing operation by the second image processing unit 13 completes so that the preview image is created, the preview image is recorded in the second memory unit 18. Then, the display unit 15 retrieves the preview image recorded in the second memory unit 18 under the control of the control unit 21. At this time, if the display unit 15 has already restarted displaying a live view image, the display unit 15 collectively displays the live view image together with the preview image (Step 18). More specifically, the display unit 15 superimposes the preview image, which is smaller than the live view image, on part of the live view image. FIG. 5C shows an example of a display by the display unit 15 in Step 18. Incidentally, the size of the preview image may be set arbitrarily, as a user of the image taking device requires.

In the meantime, the preview image alone may be displayed beforehand if the preview image has already been retrieved before the display unit 15 restarts displaying a live view image, namely before retrieving the live view image. Then, the display unit 15 may collectively display the live view image and the preview image, as soon as it retrieves the live view image.

Later on, after the predetermined time period passes since displaying the preview image has started, the display unit 15 finishes displaying the preview image under the control of the control unit 21. As a result, the display of the display unit 15 returns to displaying the live view image without displaying the preview image (Step 19). FIG. 5D shows an example of a display by the display unit 15 in Step 19.

Incidentally, it is also conceivable that the shutter button of the input unit 20 is held down while the display unit 15 is displaying the preview image. In this case, even before the predetermined time period passes since the display unit 15 displays the preview image, the display unit 15 discontinues displaying the preview image. Then, image taking unit 11 executes taking an image under the control of control unit 21.

FIG. 6 shows a time-series example of images saved in the buffer 16 and images displayed in the display unit 15, in the present embodiment.

The buffer 16 records images, captured by the image taking unit 11, in due order.

A captured image 1 through a captured image 3, which are recorded in the buffer 16, are converted into a live view image 1 through a live view image 3, respectively, in due order by the first image processing unit 12. Then, the created live view images are written into the first memory unit 17 in due order.

Subsequently, the display unit 15 retrieves the live view images written in the first memory unit 17 in due order, and displays the retrieved live view images 1 through 3 in due order.

Next, when the shutter button is held down to create a taken image by the image taking unit 11, the buffer 16 records the taken image.

A taken image 1 recorded in the buffer 16 is converted into a preview image 1 by the second image processing unit 13. The preview image 1 created is written into the second memory unit 18. Incidentally, the time for the image taking unit 11 to create a taken image is generally longer than the time for capturing an image. Therefore, a time lag somewhat occurs after the image taking unit 11 starts creating a taken image, and before a restart of capturing an image. Accordingly, a time lag also occurs after the display unit 15 retrieves the captured image 3, and before retrieving a next image. Therefore, in the present embodiment, while the image taking unit 11 is creating a taken image, a display of the display unit 15 pauses under the condition of displaying the live view image of the captured image 3.

When the image taking unit 11 completes creating the taken image, and then the second image processing unit 13 as well as the third image processing unit 14 retrieve the taken image 1 from the buffer 16, the image taking unit 11 restarts capturing an image. Then, the buffer 16 records a captured image 4 and a captured image 5 in due order.

The captured images 4 and 5 recorded in the buffer 16 in due order are converted into live view images in due order by the first image processing unit 12. Then, the created live view images 4 and 5 are written into the first memory unit 17 in due order.

Subsequently, the display unit 15 retrieves the live view images 4 and 5 written in the first memory unit 17 in due order, and then displays the retrieved live view images 4 and 5 in due order. In other words, the display unit 15 restarts displaying a live view image, out of the condition of pausing while displaying the live view image 3 of the captured image 3.

If the display unit 15 retrieves the preview image 1 at the time of the restart of displaying the live view image, in other words while displaying the live view image 4, the display unit 15 displays the preview image 1 together with the live view image 4. On this occasion, a time period for a process of creating a preview image from a taken image may sometimes be longer than a time period for a process of creating a live view image from a captured image, because the amount of data of the taken image is greater than that of the captured image. Therefore, sometimes the display unit 15 may retrieve the preview image 1 at the time while displaying, for example, the live view image 5 of the captured image 5 subsequent to the captured image 4. In this case, the display unit 15 displays the preview image of the taken image 1 together with the display of the live view image 5, after displaying the live view image 4.

In the meantime, the third image processing unit 14 creates an image for save by using the taken image 1 that has been obtained, and writes the image for save into the saving memory unit 19. On this occasion, a process for creating the image for save may include a compression process, a gradation converting process, an image sharpness adjusting process, a color conversion process, and the like with respect to the taken image 1, and these processes are not necessarily required. More specifically, the taken image 1 may sometimes be written into the saving memory unit 19 without being processed through the compression process.

Thus, until the time of retrieving the preview image 1 of the taken image 1, the display unit 15 according to the present embodiment displays a live view image of a captured image. Then, as soon as the preview image of the taken image 1 is retrieved, the display unit 15 displays the preview image together with the live view image.

Subsequently, if the predetermined time period passes after displaying the preview image 1, the display unit 15 finishes displaying the preview image 1.

As described above, in the image taking device according to the present embodiment, when the image taking unit 11 completes taking an image, the display unit 15 collectively displays a preview image and a live view image. Thus, the user of the image taking device can check the taken image while watching the live view display. Therefore, for example, without missing a shooting object, framing operation can be done quickly Furthermore, without waiting for completion of displaying a preview image, commanding operation for taking a next image can be carried out. Therefore, in the case of the image taking device according to the present embodiment, it becomes possible to increase the image taking efficiency at the time of taking a plurality of images continuously.

Furthermore, in the present embodiment, after completion of taking an image, the image taking unit 11 starts the image capturing process in parallel with the processes with respect to a taken image by the second image processing unit 13 and the third image processing unit 14. Therefore, immediately after the image taking unit 11 completes taking the image, the display unit 15 can restart displaying a live view image. Namely, in comparison with the case shown in FIG. 9C and FIG. 9D, in which displaying a live view image restarts after completion of displaying a preview image by using the entire screen, the time period after completion of taking the image until a restart of displaying the live view image can be shortened. Therefore, it becomes possible to further increase the image taking efficiency at the time of taking a plurality of images continuously.

Moreover, in the present embodiment, when the predetermined time period passes after the start of displaying the preview image, the display unit 15 finishes displaying the preview image. Thus, it becomes possible for the user of the image taking device 11 to visually check the part of the live view image as well, which has been covered with the preview image, after the passage of the predetermined time period. On this occasion, the predetermined time period may be set to he changeable arbitrarily by the user of the image taking device. Accordingly, for example, in the case of low necessity for checking the taken image, the time period for displaying the preview image can be set to be short.

Furthermore, in the present embodiment, if an image-taking command signal is input into the image taking unit 11 while the display unit 15 is displaying a preview image, the display unit 15 discontinues displaying the preview image. As a result, avoided can be a plurality of preview images that remain displayed on the display unit 15 in the case of a continuous shooting at a high speed.

Moreover, in the present embodiment, the image processing operation with respect to a taken image by the second image processing unit 13 does not include, for example, a gradation converting process, an image sharpness adjusting process, a color conversion process, and the like with respect to the image. Therefore, in comparison with a case where the second image processing unit 13 carries out these processes, the time period after completion of taking the image by the image taking unit 11 until displaying the preview image can be shortened. Therefore, it becomes possible to further increase the image taking efficiency at the time of taking a plurality of images continuously.

Figure 9A:
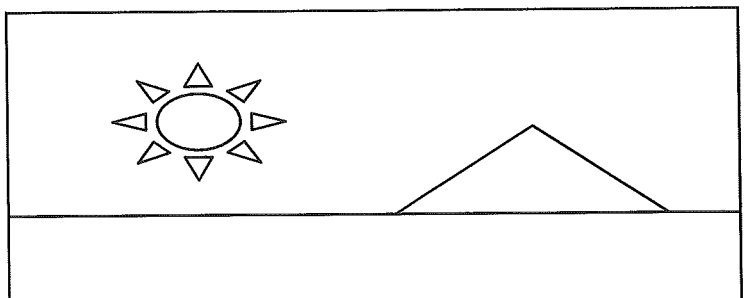
FIG. 9A to FIG. 9D show an example of a display by a display unit of an image taking device according to the present invention.
Figure 9B:
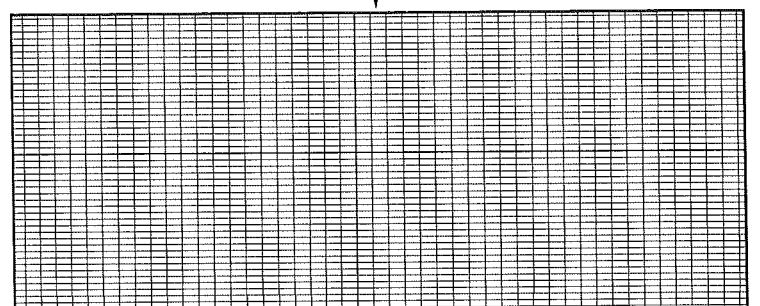
Figure 9C:
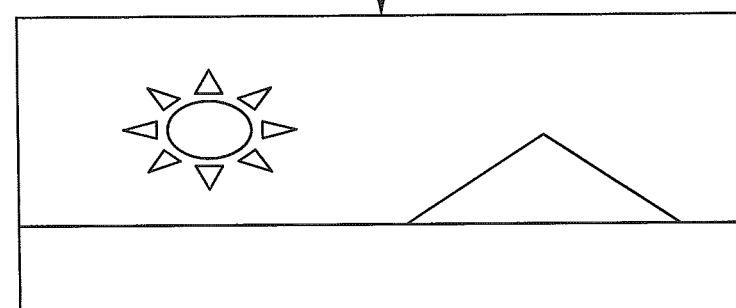
Figure 9D:
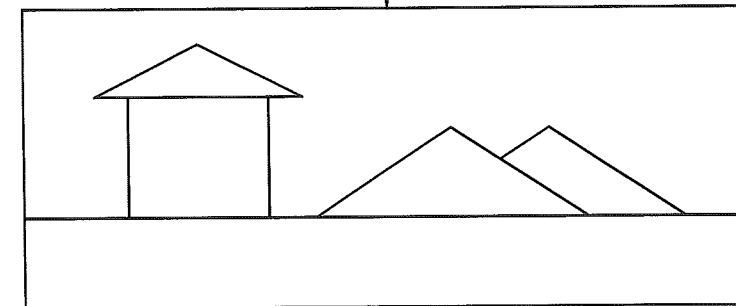

Furthermore, in the present embodiment, until the image taking unit 11 completes creating a taken image, a display of the display unit 15 pauses under the condition of displaying the live view image that the image taking unit 11 has obtained immediately before the start of creating the taken image. Therefore, in comparison with a case where a black screen is displayed until completion of creating the taken image as shown in FIG. 9B, framing operation for continuously taking images can be done easily.

Incidentally, thought the input unit 20 in the present embodiment is equipped with the shutter button, it is not limited to such a setup. More specifically, the input unit 20 may be a touch panel unit. In this case, an image-taking command signal may be sent from the input unit 20 by means of touching a predetermined position on the touch panel unit.

Furthermore, though the image taking device according to the present embodiment includes the saving memory unit 19, it is not limited to such a setup. More specifically, the image taking device may not have a saving memory unit internally, but may be connected to an external memory unit. In this case, the image for save, created by the third image processing unit 14, may be stored in the external memory unit.

Moreover, according to the present embodiment, though turning on the power for the image taking device automatically starts taking an image by the image taking unit 11, the image taking device is not limited to such a setup. More specifically, for example, the input unit 20 may be equipped with an image-capturing start button. In this case, by means of holding down the image-capturing start button of the input unit 20 after turning on the power for the image taking device, the image taking device may progress into an image-taking mode to start capturing an image by the image taking unit 11. Furthermore, if the input unit 20 is structured with a touch panel unit, touching a predetermined position on the touch panel unit may start capturing an image by the image taking unit 11.

Moreover, the buffer 16 according to the present embodiment may be structured with a plurality of buffers. For example, the buffer 16 may include a first buffer for recording a captured image and a second buffer for recording a taken image.

Moreover, according to the present embodiment, though the second image processing unit 13 carries out contracting a taken image that has been obtained, in order to display a preview image as a slave screen in a part of the display unit 15, such a setup is not indispensable. More specifically, when the display unit 15 displays a preview image and a live view image together, for example, the preview image may be displayed on an entire screen of the display unit 15, while the live view image being displayed as a slave screen in a part of the display unit 15. Alternatively, the display unit 15 may display the live view image and the preview image individually on the entire screen while overlapping both the images there. In this case, either of the live view image and the preview image is displayed, having high transparency. In such a case, it is not necessarily needed for the second image processing unit 13 to carry out contracting a taken image.

Moreover, the image taking device according to the present embodiment may further be equipped with a transmission unit. Then, a taken image written in the saving memory unit 19 may be transmitted to an external device by the transmission unit.

Example 3

Explained next is an image taking device according to a third exemplary embodiment of the present invention.

Since a configuration of the image taking device according to the present embodiment is the same as that of the second embodiment, an explanation for the configuration is omitted.

Then, operation of the image taking device according to the present embodiment is explained below.

The operation of the image taking device according to the present embodiment is the same as that of the second embodiment, except a difference in a way of displaying a preview image by the display unit 15.

The way of displaying a preview image by the display unit 15 according to the present embodiment is explained below with reference to FIG. 7. Incidentally, the display unit 15 displays the preview image under the control of control unit 21.

In the present embodiment, an animation is adopted for displaying the preview image by the display unit 15.

Figures 7A, 7B, 7C, 7D:
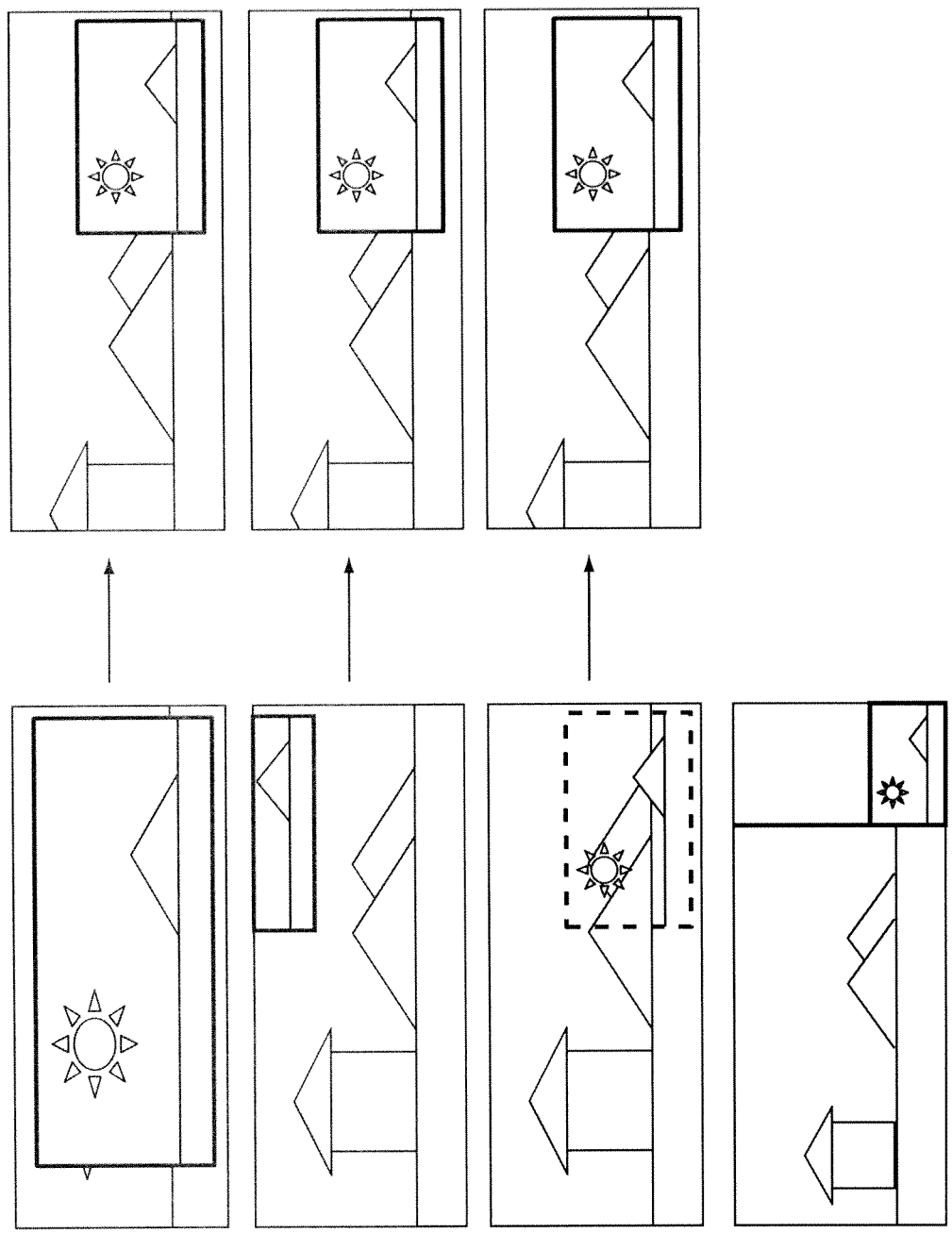
FIG. 7A to FIG. 7D show an example of a display by a display unit of the image taking device according to a third exemplary embodiment of the present invention.

An example of an animation adopted for displaying a preview image is shown in FIG. 7A to FIG. 7C.

FIG. 7A shows a displaying example in which adopted is an animation that contracts the preview image in its size gradually with the passage of time.

FIG. 7B shows a displaying example in which adopted is an animation that scrolls a position of the preview image to a predetermined position.

FIG. 7C shows a displaying example in which adopted is an animation that fades in by means of decreasing transparency of the preview image with the passage of time.

Thus, adopting an animation for displaying the preview image easily enables a user of the image taking device to intuitively recognize that the image-taking operation has completed.

Furthermore, an animation may be adopted not only for displaying a preview image but also for completion of displaying a preview image. More specifically, at the time to end displaying the preview image, the preview image may be scrolled so as to move outside the screen of the display unit 15. Alternatively, the preview image may fade out by means of gradually increasing transparency of the preview image. Still alternatively, the preview image may be moved toward an icon representing a saving folder on as to be eventually drawn in the icon.

Adopting various animations as described above easily enables the user of the image taking device to intuitively recognize what kind of process is carried out in the device.

Furthermore, according to the present embodiment, though the preview image is so displayed as to overlap the live view image, it is not limited to such a setup. More specifically, as shown in FIG. 7D, the screen of the display unit 15 may be so partitioned as to have one area for displaying the live view image and the other area for displaying the preview image. Accordingly, this arrangement prevents the preview image from hiding part of the live view image. Moreover, even in the case of this arrangement in which the screen area of the display unit 15 is partitioned, the animations as described above may be adopted in the area for displaying the preview image.

Furthermore, the animations to be adopted are not limited to those shown in FIG. 7A to FIG. 7C. More specifically, for example, the control unit 21 may carry out control in such a way that a shape of the preview image changes in accordance with the passage of time.

Figure 8:
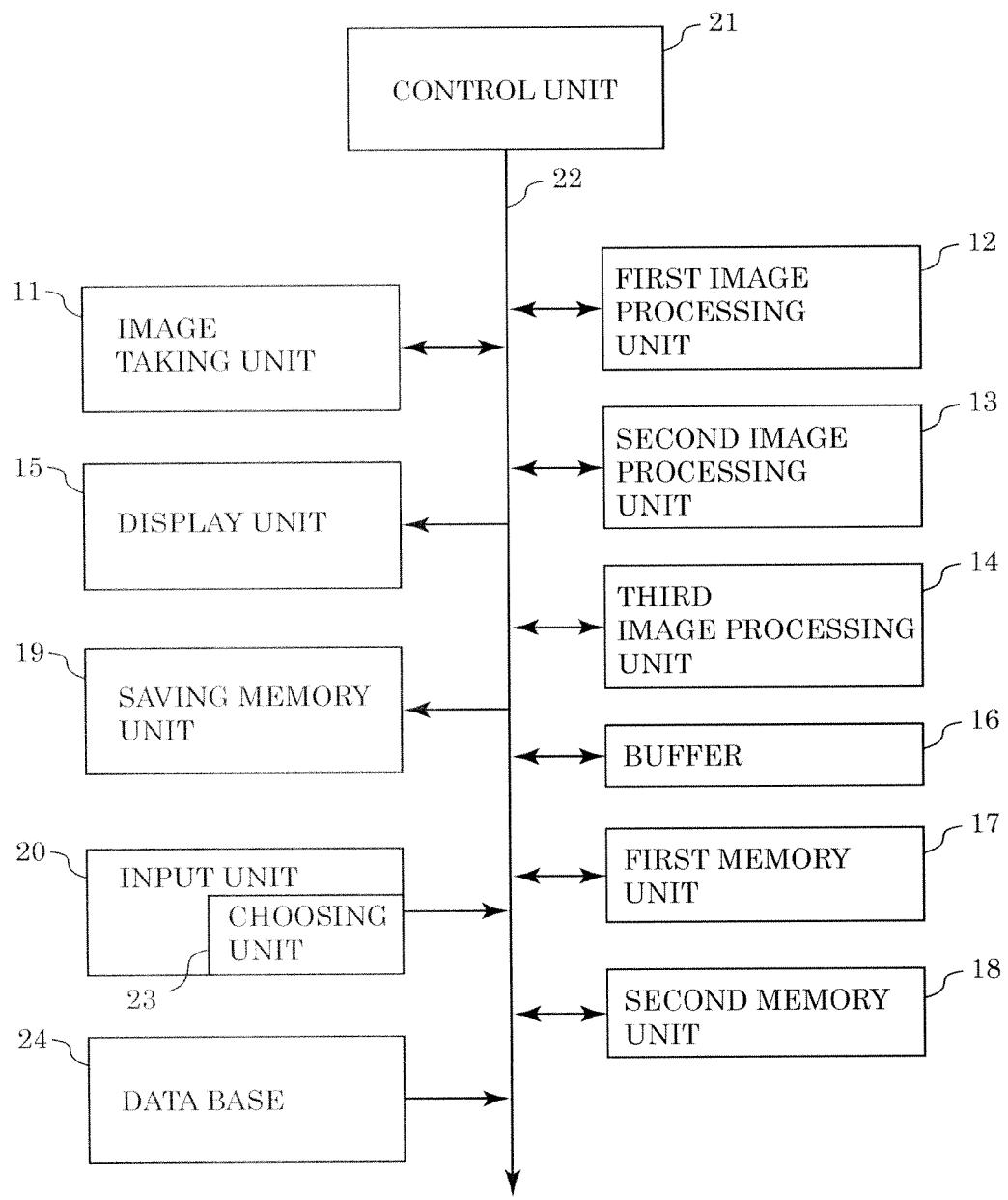
FIG. 8 shows an example of a configuration of an image taking device according to the third embodiment of the present invention.

The image taking device may be equipped with a data base 24 as shown in FIG. 8, in which various display patterns shown in FIG. 7 are recoded. Then, the image taking device may be configured in such a way that the user of the image taking device can arbitrarily choose a display pattern. In this case, the input unit 20 may be equipped with a choosing unit 23 for choosing a display pattern. When the user of the image taking device arbitrarily chooses a display pattern by using the choosing unit 23, the control unit 21 may control the display unit 15 in such a way as to display the display pattern chosen. Accordingly, it becomes possible to carry out displaying operation as the user of the image taking device wants.

Furthermore, needless to add; while the image taking device being supplied with a recording medium in which a software program code for implementation of a function of each embodiment is recorded, the first embodiment through the third embodiment are materialized when a computer of the image taking device reads out and executes the program code saved in the recording medium.

Incidentally, as the recording medium for supplying the program, used may be any medium; for example, such as a CD-ROM (Compact Disc Read Only Memory), a DVD-R (Digital Versatile Disk Recordable), an optical disc, a magnetic disc, a non-volatile memory card, and the like, as long as it can save the program described above.

The present invention is explained above with reference to the embodiments. Incidentally, the present invention is not limited to the embodiments described above. Various modifications, understandable by those in the art, can be made with respect to the configuration and details of the present invention within a scope of the present invention.

The present application claims a priority on the basis of Japan Patent Application Number: 2009-245995 filed on Oct. 27, 2009; and herewith includes all the contents.

INDUSTRIAL APPLICABILITY

The image taking device described in the first embodiment through the third embodiment can be applied, for example, for a digital camera, a mobile terminal equipped with a camera function, as well as any other device having an image-displaying function and an image-shooting function.

REFERENCE SIGNS LIST 1. and 11. image taking unit
2. and 12. first image processing unit
3. and 13. second image processing unit
4. and 14. third image processing unit
5. and 15. display unit
16. buffer
17. first memory unit
18. second memory unit
19. saving memory unit
20. input unit
21. control unit
22. buss
23. choosing unit
24. data base

The invention claimed is:

1. An image taking device comprising:
an image taking unit for carrying out an image capturing process and a creating process of a taken image;
a first image processing unit for creating a live view image by using an image captured by the image taking unit;
a second image processing unit for creating a preview image by using the taken image;
a third image processing unit for saving the taken image; and
a displaying unit for displaying the preview image in addition to displaying the live view image,
wherein at the time to end displaying the preview image, the displaying of the preview image is moved toward an icon representing a saving folder so as to be eventually drawn in the icon.

2. The image taking device according to claim 1, wherein, after completion of the creating process of the taken image by the image taking unit, the image taking unit starts the image capturing process in parallel with the creation of the preview image by the second image processing unit.

3. The image taking device according to claim 1, wherein, after a predetermined time period passes since displaying the preview image has started, the display unit finishes displaying the preview image.

4. The image taking device according to claim 1, wherein:
the image taking device further comprises a command sending unit for sending an image-taking command signal;
the image taking unit carries out the creating process of a taken image according to an input of the image-taking command signal; and
if the image-taking command signal is sent out from the command sending unit while the display unit is displaying the preview image, the display unit discontinues displaying the preview image.

5. The image taking device according to claim 1, wherein the display unit displays the preview image in such a way that at least one of the transparency, shape, size, and position of the preview image changes in accordance with the passage of time.

6. The image taking device according to claim 1, wherein, at the time of displaying the live view image and the preview image together, the display unit displays one area for displaying the live view image and the other area for displaying the preview image separately.

7. The image taking device according to claim 1, wherein, during execution of the creating process of the taken image by the image taking unit, the display unit displays the live view image created by using the captured image that the image taking unit has captured immediately before the start of creating the taken image.

8. The image taking device according to claim 1, wherein the processing operation by the second image processing unit for creating the preview image by using the taken image includes only a process for contracting the taken image.

9. The image taking device according to claim 1, wherein:
the image taking device comprises a data base for recording a plurality of display patterns for the preview image, and a choosing unit for arbitrarily choosing a display pattern out of the plurality of display patterns recorded in the data base; and
the display unit displays the preview image according to the display pattern chosen by the choosing unit.

10. The image taking device according to claim 1, further comprising:
a buffer for recording the captured image and the taken image;
a first memory unit for recording the live view image; and
a second memory unit for recording the preview image;
wherein:
the captured image captured by the image taking unit is recorded in the buffer, and subsequently sent from the buffer to the first image processing unit;
the taken image created by the image taking unit is recorded in the buffer, and subsequently sent from the buffer individually to the second image processing unit and the third image processing unit;
the live view image created by the first image processing unit is recorded in the first memory unit, and subsequently sent from the first memory unit to the display unit;
the preview image created by the second image processing unit is recorded in the second memory unit, and subsequently sent from the second memory unit to the display unit; and
the display unit displays the live view image and the preview image together.

11. A method of taking an image comprising:
an image capturing step for capturing an image;
a taken-image creating step for creating a taken image;
a first image processing step for creating a live view image by using an image captured through the image capturing step;
a second image processing step for creating a preview image by using the taken image;
a third image processing step for saving the taken image; and
a displaying step for displaying the preview image in addition to displaying the live view image,
wherein at the time to end displaying the preview image, the displaying of the preview image is moved toward an icon representing a saving folder so as to be eventually drawn in the icon.

12. The method of taking an image according to claim 11, wherein, after completion of the taken-image creating step, the image capturing step starts in parallel with the second image processing step.

13. The method of taking an image according to claim 11, wherein, after a predetermined time period passes since displaying the preview image has started, the displaying step finishes displaying the preview image.

14. The method of taking an image according to claim 11, further comprising a command sending step for sending an image-taking command signal, wherein:
the taken-image creating step carries out the creating process of a taken image according to an input of the image-taking command signal; and
if the image-taking command signal is sent out through the command sending step while the display screen is displaying the preview image, the displaying step discontinues displaying the preview image.

15. The method of taking an image according to claim 11, wherein the displaying step displays the preview image in such a way that at least one of the transparency, shape, size, and position of the preview image changes in accordance with the passage of time.

16. The method of taking an image according to claim 11, wherein, at the time of displaying the live view image and the preview image together, the displaying step displays one area for displaying the live view image and the other area for displaying the preview image separately.

17. The method of taking an image according to claim 11, wherein, during execution of the taken-image creating step, the displaying step displays the live view image on the display screen, the live view image being created by using an image that the image capturing step has captured immediately before the start of the taken-image creating step.

18. The method of taking an image according to claim 11, wherein the processing operation by the second image processing step for creating the preview image by using the taken image includes only a process for contracting the taken image.

19. The method of taking an image according to claim 11, further comprising:
a display pattern recording step for recording a plurality of display patterns for the preview image, and a choosing step for arbitrarily choosing a display pattern out of the plurality of display patterns recorded through the display pattern recording step;

wherein the displaying step displays the preview image according to the display pattern chosen through the choosing step.

20. The method of taking an image according to claim 11, further comprising:

a captured-image recording step for recording the captured image;

a taken-image recording step for recording the taken image;

a live view image recording step for recording the live view image; and a preview image recording step for recording the preview image;

wherein:

the captured image captured through the image capturing step is recorded through the image recording step, and subsequently sent to the first image processing step;

the taken image created through the taken-image creating step is recorded through the taken-image recording step, and subsequently sent to the second image processing step and the third image processing step individually;

the live view image created through the first image processing step is recorded through the live view image recording step, and subsequently sent to the displaying step;

the preview image created through the second image processing step is recorded through the preview image recording step, and subsequently sent to the displaying step; and the displaying step displays the preview image in addition to displaying the live view image.

21. An image taking program stored in a non-transitory recording medium for executing the method of taking an image, according to claim 11, by using a computer.

22. The image taking device according to claim 1, wherein at the time to end displaying the preview image, the preview image is moved toward an icon representing a saving folder so as to be drawn in the icon.

23. The image taking device according to claim 1, wherein a changing of view displays collectively the preview image from the second image processing unit together with the live view image from the first image processing unit, wherein the image captured for the live view image has less pixels than the taken image for the preview image, wherein the live view image is substantially a real-time display of an image processed by the first image processing unit from the image captured, the live image being recorded in a first memory unit separate from a second memory unit, wherein the preview image for temporary display is an image as a result of processing the taken image by the second image processing unit for displaying by the display unit, the preview image being recorded in the second memory unit, wherein the preview image from the second image processing unit includes a different processing than the live view image from the first image processing unit, and wherein the display unit retrieves the preview image from the second memory unit and the live view from the first memory unit.

* * * * *